United States Patent
Bhagavatula

[11] Patent Number: 6,046,854
[45] Date of Patent: Apr. 4, 2000

[54] MULTI-PATH INTERFERENCE FILTER WITH REFLECTIVE SURFACES

[75] Inventor: Venkata A. Bhagavatula, Big Flats, N.Y.

[73] Assignee: Corning Incorporated, Corning, N.Y.

[21] Appl. No.: 09/110,821

[22] Filed: Jul. 6, 1998

Related U.S. Application Data

[63] Continuation-in-part of application No. 08/784,020, Jan. 15, 1997, Pat. No. 5,841,583.
[60] Provisional application No. 60/011,444, Feb. 9, 1996.

[51] Int. Cl.[7] .............................. G02B 27/00; G02B 6/26
[52] U.S. Cl. .............................. 359/577; 359/584; 385/42
[58] Field of Search ..................................... 359/577, 584; 385/27, 39, 42

[56] References Cited

U.S. PATENT DOCUMENTS

| | | |
|---|---|---|
| 3,035,492 | 5/1962 | Blythe . |
| 3,459,467 | 8/1969 | Kantor . |
| 3,493,288 | 2/1970 | Kaufman et al. . |
| 3,552,826 | 1/1971 | Hanes et al. . |
| 3,626,321 | 12/1971 | Smith . |
| 3,666,351 | 5/1972 | Pao . |
| 4,076,422 | 2/1978 | Kohno ..................................... 359/577 |
| 4,196,396 | 4/1980 | Smith . |
| 4,240,696 | 12/1980 | Tracy et al. . |
| 4,362,359 | 12/1982 | Dammann et al. . |
| 4,377,324 | 3/1983 | Durand et al. . |
| 4,400,058 | 8/1983 | Durand et al. . |
| 4,461,535 | 7/1984 | Marcatili . |
| 4,466,699 | 8/1984 | Droessler et al. . |
| 4,472,797 | 9/1984 | Nicia . |
| 4,474,427 | 10/1984 | Hill et al. . |
| 4,486,071 | 12/1984 | Levinson . |
| 4,550,975 | 11/1985 | Levinson et al. . |
| 4,715,027 | 12/1987 | Mahapatra et al. . |
| 4,718,055 | 1/1988 | Winzer . |
| 4,718,754 | 1/1988 | McIntosh . |

(List continued on next page.)

FOREIGN PATENT DOCUMENTS

| | | |
|---|---|---|
| 26669 | 5/1930 | Australia . |
| 0 250 824 | 1/1988 | European Pat. Off. . |
| 2136266 | 2/1973 | Germany . |
| 2264792 | 9/1993 | United Kingdom . |
| WO 96/07114 | 3/1996 | WIPO . |
| WO9607114 | 3/1996 | WIPO . |

OTHER PUBLICATIONS

Light Modulator by A. H. Nethercot, Jr., IBM Technical Disclosure Bulletin, vol.6, No. 7, Dec. 1963, pp. 55–56.

"Pigtailed high–finesse tunable fibre Fabry–Perot interferometers with large, medium and small free spectral ranges" by J. Stone and L. W. Stulz, Electronic Letters, IEE, vol. 23, No. 15, Jul. 15, 1987, 4 pages.

(List continued on next page.)

*Primary Examiner*—Jon Henry
*Attorney, Agent, or Firm*—William Greener; Juliana Agon

[57] ABSTRACT

An interference filter (10, 30, 50, 70, 90, 110, 130, 150, or 190) filters selected wavelengths by dividing an input beam into two or more intermediate beams having different optical path lengths and by recombining the intermediate beams into an output beam that is modified by interference between the intermediate beams. An optical path length difference generator (20, 40, 60, 80, 100, 120, 140, 160, or 200) varies the optical path lengths of the intermediate beams by changing the physical lengths of their paths or the refractive indices of the mediums in which they are conveyed. The optical path length generator (20) of one exemplary embodiment (10) includes a spacer plate (20) that is divided into elements (22 and 24) having different refractive indices for varying the optical path lengths of the intermediate beams. Another optical path length difference generator (140) is formed by a stack of partially reflective surfaces (144) that are spaced apart in the direction of beam propagation by at least one nominal wavelength for varying the physical path lengths between the intermediate beams.

5 Claims, 5 Drawing Sheets

U.S. PATENT DOCUMENTS

| | | |
|---|---|---|
| 4,735,478 | 4/1988 | Hily et al. . |
| 4,748,614 | 5/1988 | Dammann et al. . |
| 4,773,063 | 9/1988 | Hunsperger et al. . |
| 4,804,249 | 2/1989 | Reynolds et al. . |
| 4,819,224 | 4/1989 | Laude . |
| 4,874,223 | 10/1989 | O'Meara . |
| 5,140,464 | 8/1992 | Kyogoku et al. . |
| 5,142,414 | 8/1992 | Koehler . |
| 5,212,584 | 5/1993 | Chung . |
| 5,287,214 | 2/1994 | Robertson et al. . |
| 5,321,539 | 6/1994 | Hirabayashi et al. . |
| 5,361,155 | 11/1994 | Chiaroni et al. . |
| 5,367,586 | 11/1994 | Glance et al. . |
| 5,390,046 | 2/1995 | Gesell et al. . |
| 5,459,576 | 10/1995 | Brunfeld et al. . |
| 5,491,580 | 2/1996 | O'Meara . |
| 5,513,289 | 4/1996 | Hosokawa et al. . |
| 5,647,040 | 7/1997 | Modavis et al. . |
| 5,691,532 | 11/1997 | Hait . |
| 5,731,889 | 3/1998 | Jeang et al. . |

OTHER PUBLICATIONS

"Split–beam Fourier filter and its application in a gain–flattened EDFA" by R. A. Betts, S. J. Frisken, and D. Wong OFC '95 Optical Fiber Communication, vol. B, 1995 Technical Digest Series, Feb. 26–Mar. 3, 1995, 3 pages.

"Analysis and Evaluation of Graded–Index Fiber–Lenses" by William L. Emkey and Curtis A. Jack, Journal of Lightwave Technology, vol. LT–5, No. 9, Sep. 1987, pp. 1156–1164.

"A Review of the Performance of Two Types of Position Tuned Filters For Use in the 1200—1600nm Range" by David J. McCartney, European Conference On Optical Communication. (ECOC), Barcelona, Sep. 22–25, 1986, vol. 1 No. Conf. 12, Sep., 1986 (Sep. 9–22 1986), pp. 133–136, XP000015023.

"Integrated Optics N X N Multiplexer on Silicon" by C. Dragone, C.A. Edwards, and R.C. Kistler, IEEE Photonics Technology Letters, vol. 3 No. 10, Oct. 1991, pp. 896–899.

"Spectrometer on chip: a monolithic WDM component" by J.B.D. Soole, A. Scherer, H.P. LeBlanc, R. Bhat, M.A. Koza, Technical Digest Wednesday Afternoon/OFC'92/, p. 123.

"Large Angular–Dispersion By Virtually–Imaged Phased–Array (VIPA) And Its Application To Wavelength Demultiplexiing" by M. Shirasaki, Fujitsu Laboratories Ltd., presented as post deadline paper on Oct. 21, 1995 at MOC '95 Hiroshima, pp. 10–13.

"Double Fabry–Perot Filter" by D. Grischkowsky and R.J Bennett, IBM Technical Disclosure Bulletin, vol. 14 No. 8, Jan. 1992, p. 2500.

"All–Optical Packet–Switched Metropolitan–Area Network Proposal" by Paul E. Green Jr., Larry A. Coldren, Kristina M. Johnson, James G. Lewis, Cal M. Miller, John F. Morrison, Robert Olshansky, Rajiv Ramaswami, and Edmund H. Smith Jr., Journal of Lighwave Technology, vol. 11 N. 5/6, May/Jun. 1993, pp. 754–763.

"A Precompetitive Consortium on Wide–Band All–Optical Networks" by Stephen B. Alexander, R.S. Bondurant, Donal Byrne, Vincent W.S. Chan, Steven G. Finn, Robert Gallager, Bernard S. Glance, Hermann A. Haus, Pierre Humblet, Raj Jain, Ivan P. Kaminow, Mark Karol, Robert S. Kennedy, Alan Kirby, Han Q. Le, Adel A.M. Saleh, Bruce Allen Schofield, Jeffrey H. Shapiro, N.K. Shankaranarayanan, Robert E. Thomas, Richard C. Williamson, and Robert W. Wilson, Journal Of Lightwave Technology, vol. 11 No. 5/6, May/Jun. 1993, pp. 714–735.

6,046,854

MULTI-PATH INTERFERENCE FILTER WITH REFLECTIVE SURFACES

RELATED APPLICATIONS

This application is a Continuation-In-Part of copending allowed parent Application Ser. No. 08/784,020, filed Jan. 15, 1997 now U.S. Pat. No. 5,841,583, by Venkata A. Bhagavatula, entitled MULTI-PATH INTERFERENCE FILTER, which parent application claims the benefit of U.S. Provisional Application Ser. No. 60/011,444, filed on Feb. 9, 1996. Both parent and provisional applications are hereby incorporated by reference.

TECHNICAL FIELD

The invention relates to optical devices for filtering selected wavelengths of light using the mechanism of interference.

BACKGROUND

Interference filters use combinations of constructive and destructive interference to shape filter responses. Wavelengths subject to constructive interference pass through the filters, and wavelengths subject to destructive interference are blocked. The interference is created by overlapping different phase-shifted portions of the same beam. Examples include Fabry-Perot etalons, dielectric filters, and fiber Bragg gratings.

Fabry-Perot etalons use pairs of opposing partially reflective surfaces to produce multiple interference between reflected beam portions. However, the filter response is limited. Sinusoidal response curves are typical. Manufacturing is complicated by a requirement for precise alignment of the reflective surfaces.

Both dielectric filters and fiber Bragg gratings have alternating layers of high and low refractive index to produce a series of partial reflections that are offset by the spacing between the layers. Typically, the layers are spaced apart by one-quarter of the nominal wavelength of the filtered beam, which is difficult to hold for assembly of dielectric filters. Conventional manufacturing of the dielectric filters is limited to bulk optics, which are generally more costly than comparable integrated optics.

The index variation of fiber Bragg gratings is very low (e.g., 0.0001) so a very large number of layers are required to attenuate unwanted wavelengths. The alternating layers are made by exposing a photosensitive material to a standing wave. This limits the choice of materials to those which are photosensitive.

U.S. Pat. No. 4,715,027 to Mahapatra et al. discloses a multi/demultiplexer that can also be arranged as a filter. An echelon grating has reflective surfaces arranged in a staircase to reflect light back to a source at equally spaced frequencies. Although the filter can be manufactured as an integrated optic, its response is also limited. The filters must be cascaded in succession similar to a vernier to further refine the response.

SUMMARY OF INVENTION

My invention also filters selected wavelengths of light by dividing a input beam of light into two or more intermediate beams having different optical path lengths and by recombining the intermediate beams into an output beam that is modified from the input beam by interference between the intermediate beams. The optical path lengths of the intermediate beams can be varied by altering either the physical lengths of their respective paths or the refractive indices of the mediums in which they are conveyed.

My multi-path filter includes input and output optical pathways and an optical path length difference generator. One or more focusing optics can be used to couple the optical path length difference generator to the input and output pathways. For example, the input and output optical pathways can be aligned with an optical axis together with a pair of focusing optics and a spacer plate that functions as the optical path length difference generator. The first focusing optic collimates an expanding input beam emitted from the input pathway. The spacer plate has two or more intermediate pathways that divide the collimated beam into a corresponding number of intermediate beams having different optical path lengths. The second focusing optic converges and recombines the intermediate beams at a focus on the output optical pathway.

Another configuration of my multi-path filter includes adjacent input and output optical pathways that are offset from the optical axis. A single focusing optic cooperates with a spacer plate and a reflective optic for both collimating an input beam from the input pathway and focusing returning intermediate beams on the output pathway. With the addition of the reflective optic, the intermediate beams traverse the spacer plate two times, thereby doubling the differences between their optical path lengths. Alternatively, the reflective optic can be curved to also perform the functions of the focusing optic. A diverging beam from the input pathway is reflected on a return course through the intermediate pathways as a converging beam to the output pathway.

The intermediate pathways of the spacer plate can be varied in number, material, transverse area, and longitudinal length for achieving a desired spectral response. Optical path length differences between intermediate beams are created by varying the refractive indices of the materials forming the intermediate pathways, by varying their length, or both. The transverse areas of the intermediate pathways control the relative energies of the intermediate beams, and the number of different intermediate pathways controls the number of intermediate beams that can contribute to the desired spectral response. In general, the number of intermediate pathways is analogous to the number of slits in a conventional interference model.

In place of the spacer plate, a reflective stack can be used to generate optical path length differences between the intermediate beams. Each layer of the reflective stack has a reflective coating that reflects a portion of the total light that is incident to the stack. The partial reflections provide a plurality of intermediate pathways that overlap spatially but separate the intermediate beams through different physical path lengths of at least one wavelength. The number, material, partial reflectivity, and longitudinal length of each layer can be controlled to adjust the spectral response.

My filter can be implemented in bulk optics, integrated optics, or in various hybrid combinations. For example, all of the elements can be constructed in planar technology. However, separately oriented elements are preferably used for more accurately reflecting light parallel to the other elements. My filter can also be incorporated within a single fiber. Two focusing optics and a spacer functioning as an optical path length difference generator are fusion spliced to join two ends of the fiber.

Materials within the spacer of the fiber or other implementation can be combined to exhibit different index characteristics with externally controlled conditions such as temperature, pressure, or electrical or magnetic fields. The controlled variation in the index difference between different intermediate pathways can be used for tuning the filter response to selected wavelengths.

DRAWINGS

DETAILED DESCRIPTION

Figure 1:
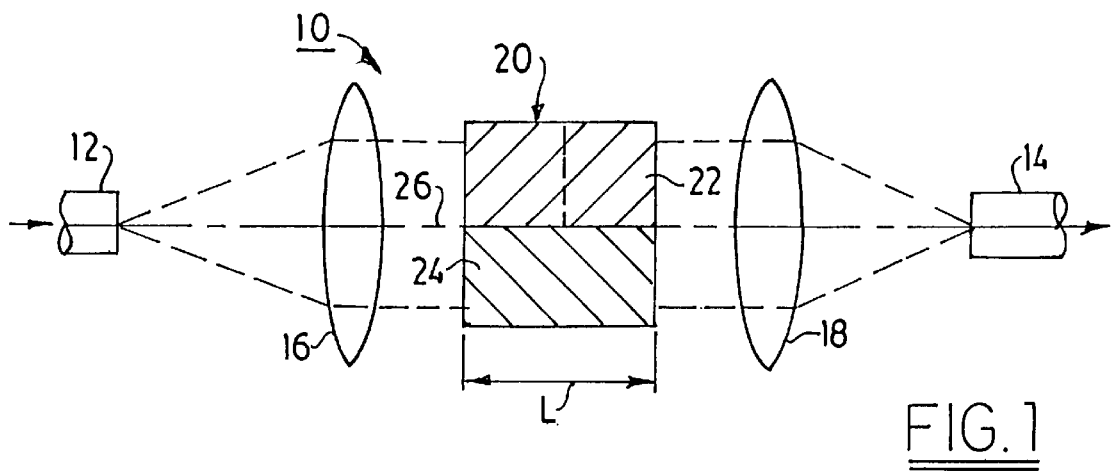
FIG. 1 is an optical diagram of my multi-path interference filter using a two-part spacer block for generating optical path length differences between axially aligned input and output fibers.

One embodiment of my invention as a multi-path filter 10 implemented in bulk optics is illustrated by FIG. 1. The illustrated filter 10 has single-mode input and output fibers 12 and 14 (input and output pathways) optically coupled by two lenses 16 and 18 (focusing optics) and a spacer plate 20 that functions as an optical path length difference generator. The first lens 16 changes an expanding input beam from the input fiber 12 into a collimated beam that strikes the spacer plate 20 at normal incidence.

The spacer plate 20 is divided into two different optical elements 22 and 24 (intermediate pathways) that extend parallel to different transverse sections of the collimated beam. The element 22 is formed by a material having a first refractive index "$n_1$,", and the element 24 is formed by a material having a second refractive index "$n_2$". The two elements 22 and 24 of the spacer plate 20 divide the collimated beam into parallel intermediate beams having different optical path lengths as determined by the following equation:

$$\Delta OPL = L\,(n_1 - n_2) \tag{1}$$

where "$\Delta OPL$" is the optical path length difference of the two intermediate beams and "L" is the longitudinal length of the spacer plate in the direction of propagation.

The second lens 18 converges and recombines the two intermediate beams to a focus at the inner end of the output fiber 14, which is located along a common optical axis 26 with the input fiber 12. When recombined, constructive interference occurs periodically at wavelengths "$\lambda$" that are integer multiples "M" of the path length difference "$\Delta OPL$". Expressed mathematically:

$$\Delta OPL = M\lambda \tag{2}$$

Figure 2:
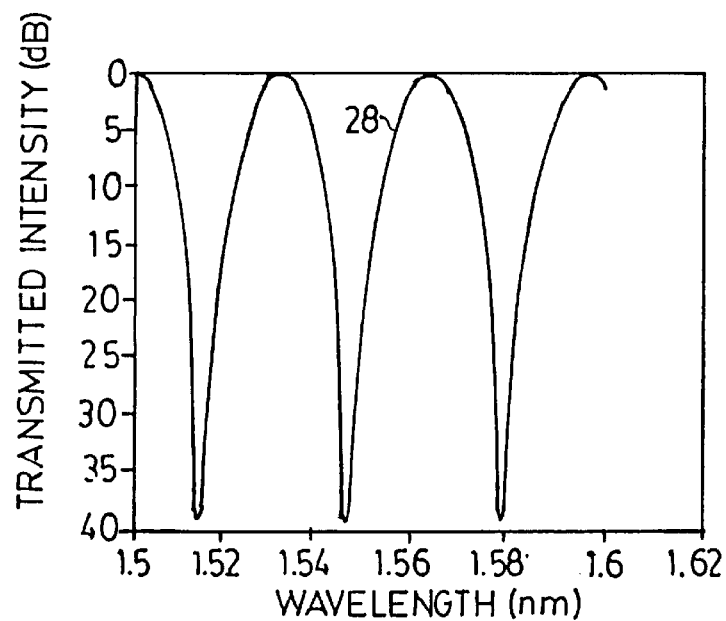
FIG. 2 is a graph of an exemplary spectral response of my filter as a measure of transmitted intensity over a domain of wavelengths.

A typical spectral response curve for the filter 10 is shown in FIG. 2. The original spectral power distribution of the beam entering the filter 10 is assumed to be even throughout the domain of measured wavelengths. The response curve 28, which reflects the spectral power distribution of the beam upon exiting the filter 10, has a cyclical form with peak intensities located at wavelengths subject to maximum constructive interference between the beams, i.e., the wavelengths that are integer multiples of the path length difference. All other wavelengths are subject to varying degrees of destructive interference. A preferred range for the multiple "M" is between 20 and 150.

Figure 3:
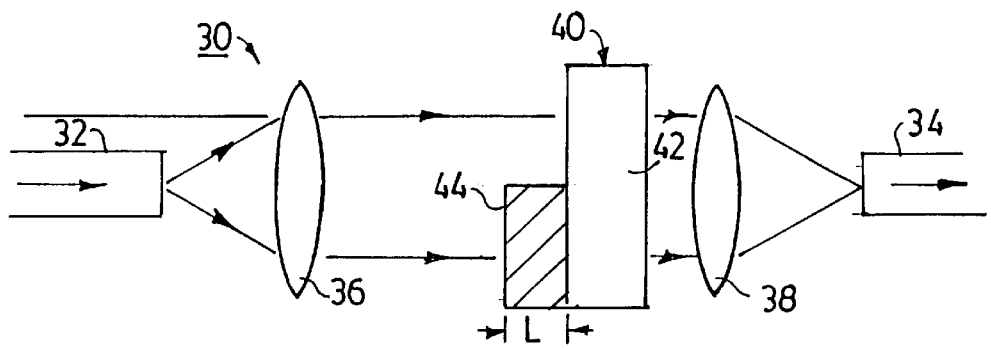
FIG. 3 is an optical diagram of a similar interference filter with an alternative spacer block.

Another multi-pass filter 30, which is shown in FIG. 3, includes similar input and output fibers 32 and 34 and lenses 36 and 38 but a different spacer plate 40. The spacer plate 40 is made from a base element 42 and an extension element 44 that distinguishes the spacer plate 40 in the transverse direction. Assuming that the base element 42 is homogeneous, the only dimension of interest to the optical path length difference is the dimension "L" of the extension element 44. Equation (1) continues to apply. However, the refractive index "$n_1$" is taken as unity and the refractive index "$n_2$" is determined from the material of the extension element 44.

Figure 4:
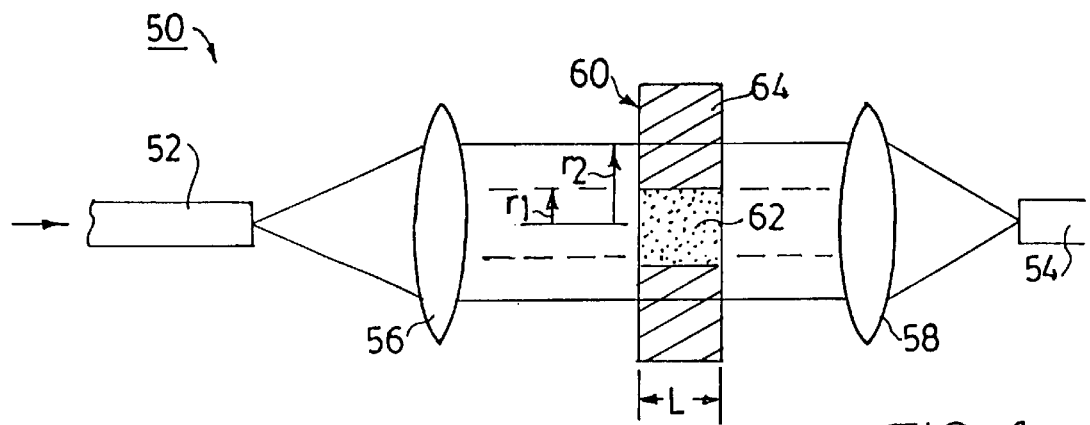
FIG. 4 is an optical diagram of a similar multi-path interference filter with an alternative spacer block having two concentric elements.

FIG. 4 illustrates another filter 50 with similar input and output fibers 52 and 54 and lenses 56 and 58. The spectral response function is also similar. However, the optical path length difference is generated by a spacer plate 60 made from two concentric elements 62 and 64 that occupy different transverse areas of aperture 66. The element 62, which has a cylindrical shape, is surrounded by annular-shaped element 64. Each of the elements 62 and 64 is made from a different material—one of which could even be air, but both elements share a common length "L".

Contrast between the respective intensities of the transmitted and non-transmitted wavelengths can be controlled by adjusting the transverse areas of the two elements 62 and 64. The respective areas are adjusted by changing the relative sizes of effective radii "$r_1$" and "$r_2$" of the two elements 62 and 64. For example, contrast can be maximized by relating the respective areas to the intensity profile of the incident collimated beam to balance spectral energies transmitted by the two elements 62 and 64. The concentric shapes of the two elements 62 and 64 simplify the division of power within beams having radially symmetric power distributions.

Figure 5:
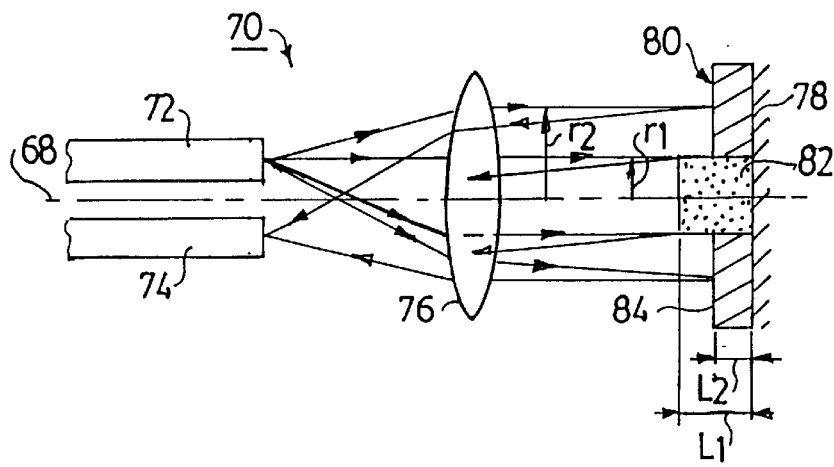
FIG. 5 is an optical diagram of my multi-path interference filter with adjacent input and output fibers optically connected by an alternative spacer block and a reflective optic.

A multi-pass filter 70 illustrated by FIG. 5 is different in several respects. Input and output fibers 72 and 74 are located next to each other on the same side of a single lens 76 but on opposite sides of (i.e., straddle) an optical axis 68. The input fiber 72 emits a diverging beam that is collimated by the single lens 76. A reflective optic 78 retroreflects the collimated beam after passing through a spacer plate 80. Upon its return, the collimated beam is reconverged by the single lens 76 to a focus at the output fiber 74. To maximize coupling efficiency, the input and output fibers 72 and 74 can be inclined toward the optical axis 68 in longitudinal alignment with an intersection between the optical axis 68 and the reflective optic 78.

The reflective optic 78 can be formed as a separate mirror or as a reflective coating on a remote surface of the spacer plate 80. Elements 82 and 84 of the spacer plate 80 are concentric but differ in both dimensions of length "$L_1$" and "$L_2$" and in material composition (i.e., $n_1$ and $n_2$). The resulting optical path difference "$\Delta OPL$" accounting for the reflection can be expressed as follows:

$$\Delta OPL = 2L_1(n_1-1) - 2L_2(n_2-1) \tag{3}$$

Despite all of these changes, a spectral response curve similar to FIG. 2 is still possible with a contrast governed by radii "$r_1$" and "$r_2$". Other shapes and sizes of the spacer elements 82 and 84 could also be used to generate the required optical path length differences.

The single lens 76 could be obviated by shaping the reflective optic as a sphere for reflecting light emanating from the input fiber 72 on a return course to the output fiber 74. The spacer elements 82 and 84 would be reshaped along radial lines to divide portions of the diverging and converging beams.

Figure 6:
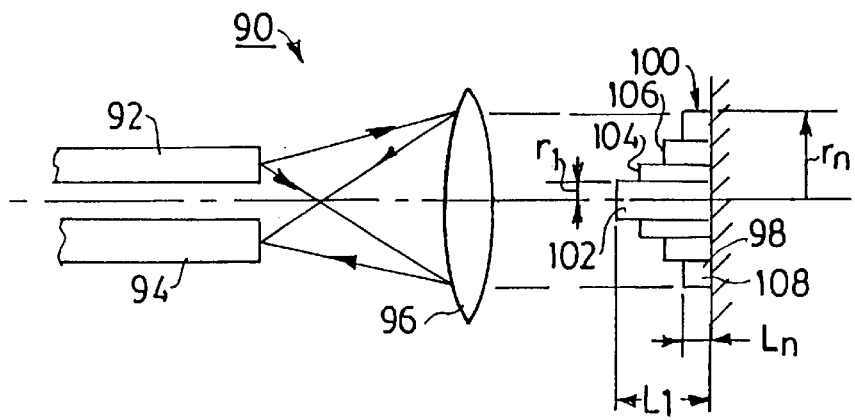
FIG. 6 is an optical diagram of a similar interference filter in which an alternative spacer block includes additional elements for providing a more complex spectral response.

FIG. 6 depicts a multi-path filter 90 that includes a similar arrangement of input and output fibers 92 and 94, together with a single lens 96 and a reflective element 98 associated with a spacer plate 100 for retroreflecting light emitted by the input fiber 92 on a return course to the output fiber 94. The spacer plate 100 is distinguished by multiple annular elements 102, 104, 106, and 108 that vary in length from "$L_1$" to "$L_n$" and that vary in radius from "$r_1$" to "$r_n$". Respective indices "$n_1$" to "$n_n$" of the annular elements 102, 104, 106, and 108 can be the same or varied. If the same, the optical path lengths of the corresponding intermediate pathways are varied by the same combinations of materials (e.g., glass and air) but in different proportions for exhibiting different effective refractive indices.

Figure 7:
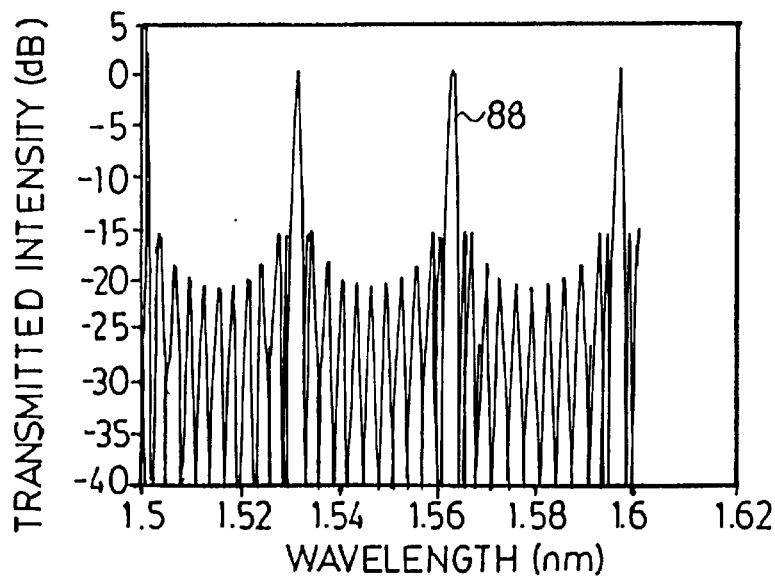
FIG. 7 is a graph similar to the graph of FIG. 2 but showing a more complex spectral response provided by the additional spacer block elements.

The result is a more complex pattern of interference generated by the combination of additional intermediate beams having respective optical path lengths relatively varied by the annular elements 102, 104, 106, and 108 of the spacer plate 100. An exemplary spectral response curve 88 of transmitted intensities over a domain of wavelengths is shown in FIG. 7. Here, the peak intensities are narrower and more widely spaced than in the response curve of FIG. 2. Further control over the shape of the response curve 88 can be achieved by relatively adjusting the lengths "$L_1$" to "$L_n$" the indices "$n_1$" to "$n_n$", or the radii "$r_1$" to "$r_n$" of the annular elements 102, 104, 106, and 108. Variations in the lengths "$L_1$" to "$L_n$" or the indices "$n_1$" to "$n_n$" affect the optical path lengths of the intermediate beams and variations in the radii "$r_1$" to "$r_n$" affect their relative power.

The intermediate pathway s th rough the respective optical path length difference generators of all five of the preceding filters illustrated by FIGS. 1–6 have equal physical path lengths but different effective indices of refraction. The spacer plates 20 and 60 form equal length intermediate pathway s that are distinguished by different materials. The spacer plates 30, 70, and 90 form equal length intermediate pathways that are distinguished by different combinations of materials, including combinations that vary only in proportion. The materials themselves can differ in composition or even physical states, such as glass and air.

Figure 8:
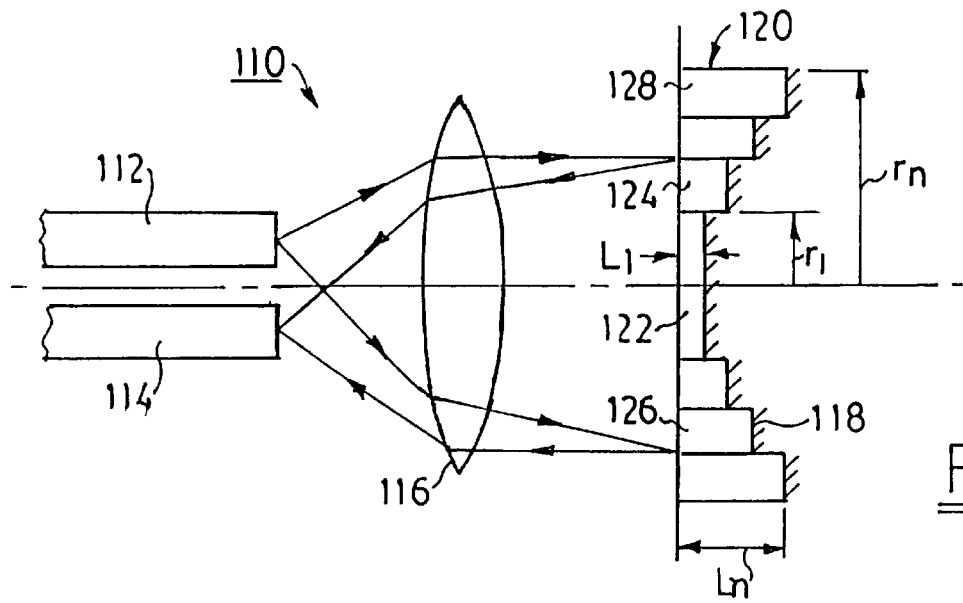
FIG. 8 is an optical diagram of a similar interference filter with an alternative spacer block for providing a complex spectral response.

A multi-path filter 110 depicted in FIG. 8 is similar in most respects to the multi-path filter 90 including input and output fibers 112 and 114, a single lens 116, a reflective element 118, and a spacer plate 120. Also similar to the multi-path filter 90, the spacer plate 120 is composed of multiple annular elements 122, 124, 126, and 128 that vary in length from "$L_1$" to "$L_n$" and that vary in radius from "$r_1$" to "$r_n$". Respective indices "$n_1$" to "$n_n$" of the annular elements 122, 124, 126, and 128 can be the same or different.

However, in contrast to all of the preceding embodiments, the relative positions of the annular elements 122, 124, 126, and 128, together with their common reflective element 118, also change the physical path lengths of the intermediate beams by the differences in their lengths "$L_1$" to "$L_n$". For example, the optical path length difference between annular elements 122 and 128 can be expressed as follows:

$$\Delta OPL = 2(L_1 n_1 - L_n n_n) \tag{4}$$

To accommodate the different length annular elements 122, 124, 126, and 128, the reflective element 118 is stepped. This is most easily accomplished by applying a reflective coating to the end faces of the annular elements 122, 124, 126, and 128. If a plane mirror is used instead, the physical path lengths of the intermediate beams are equated similar to the embodiment of FIG. 6.

Similar to the embodiments of FIGS. 5 and 6, the single lens 116 can be obviated by reshaping the reflective element 118. However, instead of shaping the reflective element 118 as a continuous curved surface, the annular steps o f th e reflective element 118 are preferably individually curved to provide a similar focusing function. The annular elements 122, 124, 126, and 128 would be tapered along radial lines to a primary focus.

In any one of the preceding embodiments, the single lenses can be replaced by diffractive optics or even diffraction pat terns inscribed on the spacers. If inscribed on the reflective surfaces, the intermediate pathways would be shaped to follow the lines of focus.

Figure 9:
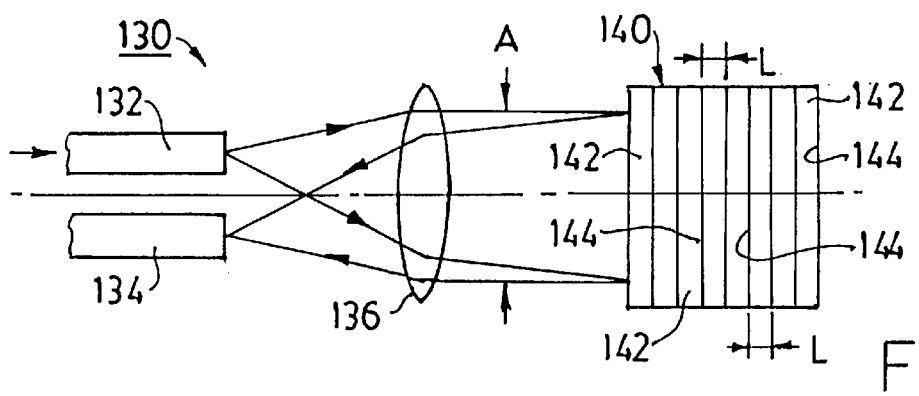
FIG. 9 is an optical diagram of my multi-path interference filter in which a reflective stack functions as an optical path length difference generator.

Like all of the preceding embodiments, the embodiment of FIG. 9 is a multi-path filter 130 having input and output fibers 132 and 134 along with a lens 136 or its equivalent. However, the optical path length difference generator is a reflective stack 140 instead of a spacer plate. The reflective stack 140 is made in layers 142 separated by partially reflective surfaces 144. Each of the layers 142 has a constant length "L" and a constant index "n", although both the length "L" and the index "n" could be varied between the layers 142 to provide a more complex spectral response.

The reflectivity of the partially reflective surfaces 144 is related to the number of layers 142 required to establish the desired spectral response. For example, if 20 of the layers 142 are required, then each of the reflective surfaces 144 is made to reflect about five percent of the overall spectral energy. The number of layers 142 is analogous to the number of intermediate pathways through the spacer plates of the preceding embodiments, and the reflectivity of each of the layers 142 is related to the transverse areas of the intermediate pathways. However, the intermediate beams can be separated by less distinct areas of each partially reflective surface 144.

In other words, the intermediate beams can occupy virtually the same space, e.g., the entire aperture "A", upon entry and exit of the reflective stack 140. However, their respective optical path lengths are distinguished by different physical lengths of travel along an optical axis 146 corresponding to a multiple of the length "L". Thus, the equation for optical path length difference between two intermediate beams from adjacent layers 142 is given by:

$$\Delta OPL = 2L\, n \tag{5}$$

The intermediate beams should be separated by an optical path difference "ΔOPL" of at least one wavelength of the propagating light beam. Spacings of at least 10 microns are preferred with average thicknesses expected in the range of 20 to 30 microns. The reflective surfaces 144 can be formed by partially reflective coatings, fully reflective coatings (e.g., metallic spots) applied to limited transverse areas, or adjacent material layers having large differences in refractive index. Refractive index differences of at least 1 percent should be used to limit the number of layers required to reflect substantially all of the propagating beam, but differences of 10 percent or more are preferred for constructing practical spectral responses. No more than 100 layers are preferably used.

Additional details regarding the construction and manufacture of similar reflective stacks are contained in my copending U.S. patent application Ser. No. 08/787,460, filed Jan. 22 1997, and entitled "Multiple Reflection Multiplexer and Demultiplexer". This application is hereby incorporated by reference.

Although all of the above embodiments are depicted in bulk optics, the same embodiments could also be implemented with integrated or hybrid optics. For example, the input and output fibers could be formed as waveguides on a substrate that also contains one or more focusing and reflecting optics, as well as the optical path length difference generator. As a hybrid design, the input and output fibers and the one or more focusing optics could be formed on a first substrate and the optical path length difference generator could be formed on a second substrate. Alternatively, the first substrate could also incorporate the optical path length difference generator, and the reflective element could be formed separately as a bulk optic mounted against a wall of the first substrate or as a reflective coating on the same wall. The focusing optic could also be a curved reflective optic that is formed separately or as a part of the same integrated device.

Angular tolerances must be tight to assure proper focusing between the input and output pathways. However, more leeway exists with lateral and longitudinal dimensions. For example, the lateral position of the spacer plate affects the distribution of light between the intermediate beams, but small variations have only a limited effect on the spectral response. Similarly, the length dimension "L" can measure as much as 0.25 mm, so small variations in the range of microns are of limited significance.

Figure 10:
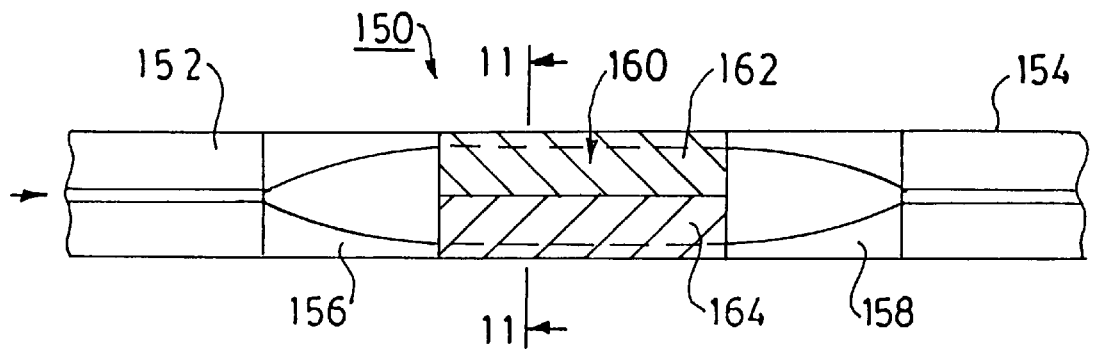
FIG. 10 is a cross-sectional view of an optical fiber incorporating my multi-path interference filter formed by two GRIN lenses and a spacer that generates optical path length differences.
Figure 11:
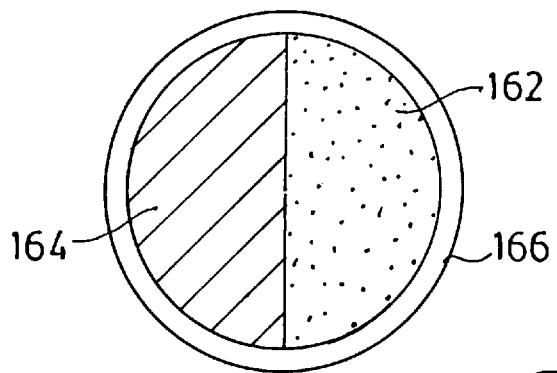
FIG. 11 is a sectional view along line 11—11 through the spacer showing two different optical segments for providing the different length paths.

My invention can also be formed as a part of a single mode optical fiber as shown in FIGS. 10 and 11. A multi-path interference filter 150 is formed between adjacent ends 152 and 154 of the single mode fiber. GRIN (gradient index) fiber rod lenses 156 and 158 and a central spacer 160 that functions as an optical path length difference generator are fusion spliced between the adjacent ends 152 and 154.

In one direction of light travel, the GRIN lens 156 collimates light emitted from fiber end 152. The spacer segment 160 is divided into two axial segments 162 and 164 (intermediate pathways) that extend between the GRIN lenses 156 and 158. Each of the segments is made from a different material and includes a different refractive index "$n_1$" and "$n_2$"—at least within the range of wavelengths intended for use. A jacket 166 can be used to encapsulate the two segments 162 and 164, so their respective materials can be in various states including solid and liquid or solid and gas. Photosensitive (e.g., $GeO_2$—$SiO_2$) or electro-optic (e.g., liquid crystal) materials could also be used.

Similar to the earlier embodiments 10, 30, 50, and 70, the two segments 162 and 164 divide the collimated light into two intermediate beams having different optical path lengths. The GRIN lens 158 recombines the two intermediate beams at a focus on the single mode fiber end 154. The resulting interference between the combined beams in the fiber end 154 produces a spectral response similar to that illustrated in FIG. 2. Additional segments occupying differing amounts of aperture area can be used to provide a more complex response.

Interference filters, including the multi-path interference filters of this invention, are subject to manufacturing variations that can affect their responses. For example, the actual central wavelengths of the filters' responses can vary from their intended central wavelengths, sometimes beyond acceptable tolerances. The environmental conditions in which the filters are used and the central wavelengths of the signals intended for filtering are also subject to change. Accordingly, some ability to adjust the filters' responses during or after their manufacture may be needed to assure their proper functioning.

The tuning of my multi-path interference filters can be performed either statically or dynamically to accomplish a number of different purposes. Static tuning, which permanently changes the filters' spectral responses, can be carried out during their manufacture to compensate for manufacturing inconsistencies or to achieve improved performance. Dynamic tuning, which produces only a temporary change in the filters' spectral responses, can be carried out during their use to compensate for changing environmental conditions or signal drift or to perform different filtering functions on demand.

Static tuning can be accomplished by using photosensitive materials to vary refractive index as a function of ultraviolet exposure. For example, one of the intermediate pathways 162 or 164 can be made with a photosensitive material such as $GeO_2$ doped silica, and the other of the intermediate pathways 162 or 164 can be made on a non-photosensitive material such as pure silica. By exposing the two pathways 162 and 164 to a controlled amount of UV light, the optical path length difference between them can be varied to set the central wavelength of the filter's response. The UV exposure can be controlled by active feedback and the exposure stopped when the desired optical characteristics are reached.

In more complicated filter configurations having more than two intermediate pathways, both the amount of doping and the relative exposure to UV light can be controlled to correct for systematic errors in the filter's response. The same or different lengths of the intermediate pathways can be exposed to the UV light. Similar results can be obtained by stress-induced changes in refractive index. For example, a stress-induced change in refractive index can be made by stretching or bending the fiber spacer segment 160 prior to mounting the segment 160 on a rigid substrate.

Figure 12:
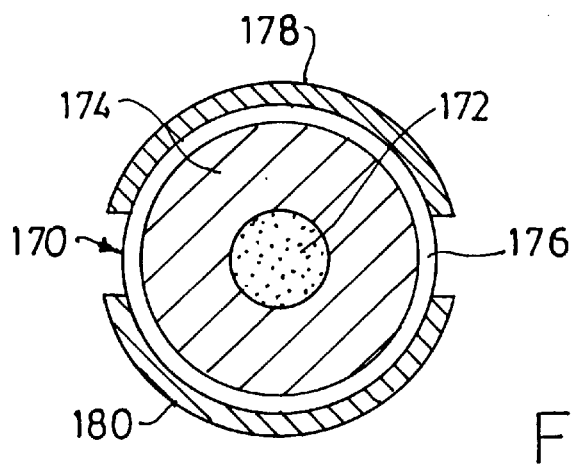
FIG. 12 is a similar sectional view of an alternative spacer enclosed by two electrodes for tuning the filter's spectral response.

Dynamic tuning can be accomplished by using one or more mechanisms such as thermo-electric effects, electro-optic effects, or stress-optic effects to temporarily change the optical path lengths of the intermediate pathways. For example, FIG. 12 shows a cross section of an alternative spacer 170 having two concentric segments 172 and 174 and a jacket 176 partly surrounded by metal electrodes 178 and 180. The inner segment 172 is made of glass, and the outer segment 174 is made of a polymer that exhibits variations in refractive index with temperature. Varying the temperature of the polymer with the electrodes changes the optical path length difference between the segments 172 and 174 and thereby alters the spectral response of the filter.

An electro-optical material such as liquid crystal can be substituted for the thermosensitive polymer of outer segment 174 and similarly controlled by a surrounding electric field to exhibit different refractive indices. Mechanically controlled stress can also be used to dynamically vary refractive index as well a physical path length. Any of these tuning techniques can be applied to the other embodiments including planar, micro-optic, fiber-based or hybrid implementations.

Figure 13:
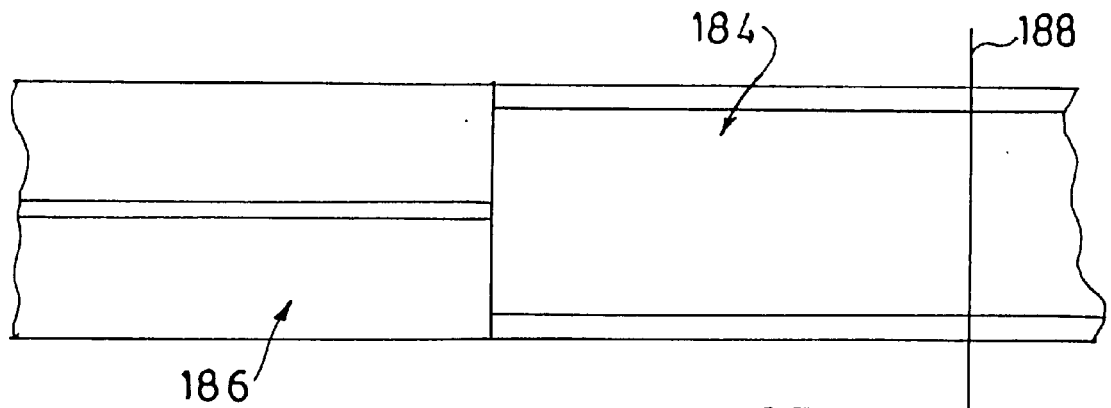
FIG. 13 is a cross-sectional view of a single mode fiber fused to a multi-mode fiber with a Gaussian index profile.
Figure 14:
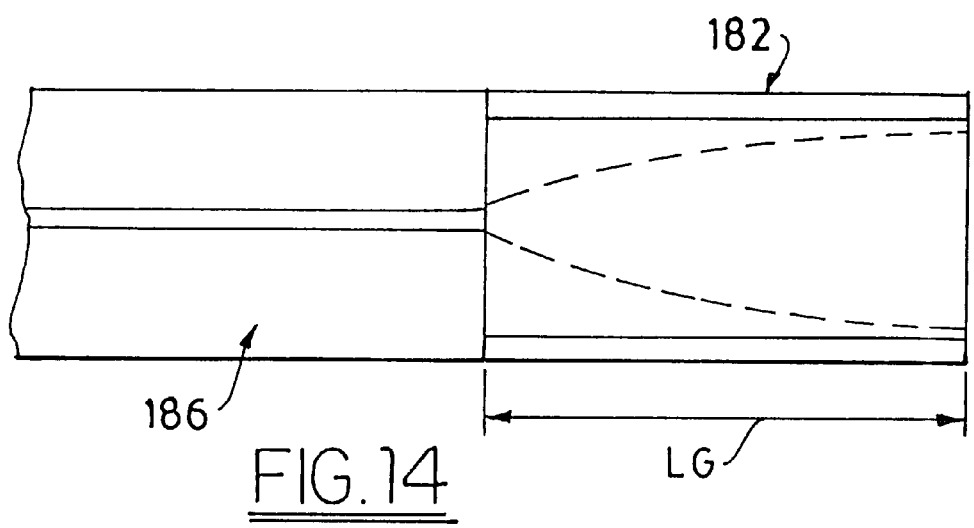
FIG. 14 is a cross-sectional view of the same two fibers with the multi-mode fiber cleaved to a length appropriate for use as a GRIN fiber rod lens.

FIGS. 13 and 14 illustrate how to make a GRIN fiber rod lens 182. A length (approximately 10 cm to 20 cm) of graded index fiber 184 is fusion spliced to a single mode fiber 186. The graded index fiber 184 has an index that varies radially according to a Gaussian profile. The graded index fiber 184 is mechanically cleaved along line 188 to a length "LG" that is equal to one-quarter of a complete cycle for refocusing a point source along the optical axis. At the specified length, light from the point source (i.e., the end of the single mode fiber) is collimated. Further information about GRIN fiber rod lenses can be found in an article by W. L. Emkey and C. A. Jack entitled "Analysis and Evaluation of Graded-Index Fiber Lenses" from Journal of Lightwave Technology LT-5, 1987, pages 1156–1164. This article is hereby incorporated by reference.

Figure 15:
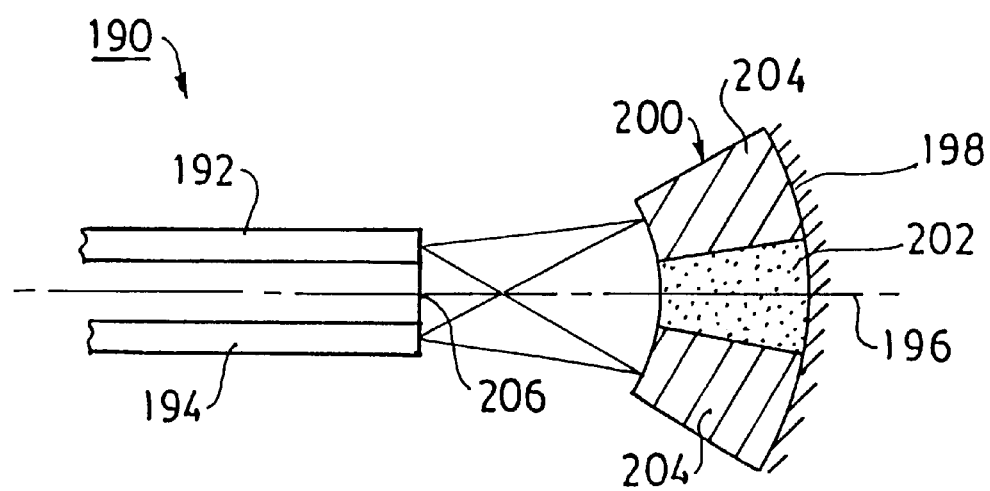
FIG. 15 is an optical diagram of an interference filter similar to the filter of FIGS. 4–6 with a reflective surface shaped to take on the functions of a focusing optic.

FIG. 15 depicts another embodiment 190 of my multi-path filter, which accomplishes the focusing function in a different way. Similar to the embodiments 70 and 90 of FIGS. 5 and 6, a reflective surface 198 couples adjacent input and output fibers 192 and 194, which straddle an optical axis 196. However, the reflective surface 198 is curved (preferably spherical in bulk implementations) to also provide the focusing function. A diverging beam emitted by the input fiber 192 is substantially retroreflected by the reflective surface 198 on a converging path to the output fiber 194.

A spacer 200 supporting the reflective surface 198 along the optical axis 196 is composed of symmetric (or concentric) optical elements 202 and 204, which have different refractive indices. The optical elements 202 and 204, which form portions of equal length intermediate pathways connecting the input and output fibers 192 and 194, converge toward a focal point 206 of the reflective surface 198. The different refractive indices of the optical elements 202 and 204 vary the optical path lengths of the intermediate pathways for producing a pattern of interference that varies the spectral power distribution of the recombined beam reaching the output fiber 194.

A similar focusing function could be performed by a plurality of individual reflectives that are offset along an optical axis such as shown in FIG. 8 but oriented to a common focal point. The offset would produce physical path length differences between the intermediate pathways in addition to or as a substitution for differences in refractive index.

My invention in its various embodiments can be used in a variety of filtering applications over a broad range of wavelengths (e.g., 1200 nm–1700 nm) including applications in the fields of communication and sensing technologies. One such application is in conjunction with an optical amplifier for amplifying specific wavelengths isolated by my filter.

Although specific embodiments of the invention have been disclosed and described herein, the invention is nonetheless limited only by the following claims.

I claim:

1. A multi-path interference filter for changing a spectral power distribution of a beam of light transmitted between input and output pathways comprising:

an optical path length difference generator optically coupling the input and output pathways and having an array of reflective surfaces that are staggered in a direction of beam propagation between the input and output pathways and are relatively sized to occupy different amounts of transverse area for reflecting correspondingly sized portions of the beam through different physical path lengths between said input and output pathways; and said reflective surfaces being relatively sized in relation to a transverse energy distribution within the beam to enhance interference between the differently sized portions of the beam.

2. The filter of claim 1 in which said reflective surfaces are oriented to provide a focusing function that couples said optical path length generator to the input and output pathways.

3. The filter of claim 1 in which said reflective surfaces are concentric for transmitting radially symmetric portions of the beam.

4. The filter of claim 1 further comprising a focusing optic that couples the input pathway to said optical path length difference generator in one direction of the beam propagation and that couples said optical path length difference generator to the output pathway in an opposite direction of beam propagation.

5. The filter of claim 1 in which optical path length differences between the differently sized beam portions are further varied by differences between the effective refractive indices of the intermediate pathways.

* * * * *